(12) United States Patent
Bodenheimer

(10) Patent No.: US 11,442,175 B2
(45) Date of Patent: Sep. 13, 2022

(54) SECURE METHOD FOR DETERMINING THE POSITION OF A RECEIVING DEVICE

(71) Applicant: Continental Teves AG & Co OhG, Frankfurt am Main (DE)

(72) Inventor: Robert Bodenheimer, Nuremberg (DE)

(73) Assignee: Continental Teves AG & Co. oHG

(*) Notice: Subject to any disclaimer, the term of this patent is extended or adjusted under 35 U.S.C. 154(b) by 0 days.

(21) Appl. No.: 17/056,932

(22) PCT Filed: May 20, 2019

(86) PCT No.: PCT/EP2019/062916
§ 371 (c)(1),
(2) Date: Nov. 19, 2020

(87) PCT Pub. No.: WO2019/233744
PCT Pub. Date: Dec. 12, 2019

(65) Prior Publication Data
US 2021/0132235 A1    May 6, 2021

(30) Foreign Application Priority Data

Jun. 8, 2018 (DE) .................. 10 2018 209 162.5

(51) Int. Cl.
*G01S 19/21* (2010.01)
(52) U.S. Cl.
CPC .................. *G01S 19/215* (2013.01)
(58) Field of Classification Search
CPC .................................................. G01S 19/215
See application file for complete search history.

(56) References Cited

U.S. PATENT DOCUMENTS

| 8,855,867 | B2 | 10/2014 | Günther et al. | |
| 9,507,026 | B2* | 11/2016 | Nichols | G01S 19/10 |
| 10,094,930 | B2* | 10/2018 | Schipper | G01S 19/29 |
| 2010/0127928 | A1 | 5/2010 | Thomson et al. | |
| 2015/0268350 | A1 | 9/2015 | Whitehead | |

FOREIGN PATENT DOCUMENTS

| EP | 2930536 A2 | 10/2015 |
| JP | 2012208033 A * | 10/2012 |
| WO | 2011098333 A1 | 8/2011 |

OTHER PUBLICATIONS

Gao et al., "Intermediate Spoofing Strategies and Countermeasures", Tsinghua Science and Technology, 2013, vol. 18, No. 6, pp. 599-605.
German Search Report for German Application No. 10 2018 209 162.5, dated May 22, 2019 with partial translation, 11 pages.
International Search Report and Written Opinion for International Application No. PCT/EP/2019/062916, dated Aug. 27, 2019, 7 pages.
International Search Report and Written Opinion for International Application No. PCT/EP2019/062916, dated Aug. 27, 2019, 12 pages (German).

* cited by examiner

*Primary Examiner* — Cassi J Galt
(74) *Attorney, Agent, or Firm* — RatnerPrestia

(57) ABSTRACT

A method for determining the position of a receiving device, wherein, by the receiving device, a GNSS signal is received that is formed in accordance with a signal transmitted from a satellite of a global satellite navigation system, wherein code data and phase information of the GNSS signal are determined and a plausibility check is carried out between the code data and phase information to detect whether the GNSS signal is a manipulating signal.

13 Claims, 2 Drawing Sheets

SECURE METHOD FOR DETERMINING THE POSITION OF A RECEIVING DEVICE

CROSS REFERENCE TO RELATED APPLICATIONS

This application is the U.S. National Phase Application of PCT International Application No. PCT/EP2019/062916, filed May 20, 2019, which claims priority to German Patent Application No. 10 2018 209 162.5, filed Jun. 8, 2018, the contents of such applications being incorporated by reference herein.

FIELD OF THE INVENTION

The invention relates to a method for determining the position of a vehicle and a corresponding control device.

BACKGROUND OF THE INVENTION

The determining of the position of a vehicle by means of GNSS signals of a global satellite navigation system GNSS is generally known. For example, three-dimensional Cartesian coordinates are established by the measurement of pseudoranges based on the code and/or phase data which are transmitted by the satellites on at least two frequencies in the L band. In the case of the available signals, a differentiation is made between the code, which is modulated onto the carrier signal and contains information about the respective satellite, and the carrier signal itself or the phasing thereof. Accordingly, a distinction is made between code and phase observations.

In order to determine the position of a vehicle, the signals of multiple satellites are received, and the distance from each of the satellites is determined in each case. However, the received GNSS signals do not necessarily lead to a congruent point on the earth. Instead, a compensation calculation is therefore performed, that is to say the point which has the smallest distance or error regarding all of the satellites or the data thereof is determined. The method of least squares (least squares method) is typically utilized for this purpose.

It is furthermore known that additional information, which is obtained by sensors, for example inertial sensors or environment sensors, should be enlisted in vehicles in order to improve the determination of the position of a vehicle. It is, for example, known from WO 2011/098 333 A1, incorporated herein by reference, that various sensor variables should be enlisted in a vehicle in order to improve already existing sensor variables or to generate new sensor variables and, consequently, to increase the detectable information.

Modern systems for determining the position of a vehicle typically have a fusion algorithm which processes at least GNSS signal data received from the receiver and dynamic information of the vehicle as input variables. All of the available input data are used at any time, and are weighted against one another by an elaborate algorithm.

During the position determination by means of the global satellite navigation system, it is possible to simply use the code observations in order to calculate coordinates. These have a significantly poorer accuracy, compared with phase observation, but are unambiguous. Phase measurements, on the other hand, are more accurate but ambiguous.

Accuracies at the level of centimeters can even be achieved with the aid of special methods, models and corrections. Whilst the determination of the absolute position in the conventional sense simply utilizes code observations, more accurate methods, for example the Precise Point Positioning method, are substantially based on the processing of the more accurate phase data, whilst the more inaccurate code observations are principally only used for calculating the necessary approximate solution. In addition to the position coordinates and the receiver clock error, the ambiguities due to the phase observation are part of the unknown here as well. Satellite orbit and satellite clock deviations accordingly have a particularly onerous effect, although the accuracy which can be achieved with this method is very good as already mentioned.

Generally, however, the GNSS position determination is subject to a known problem, namely the possibility of so-called spoofing, during which an artificial, so to speak falsified, satellite signal is produced, which is formally valid, but which is not a genuine GNSS signal. In the GNSS receiver it ensures that the wrong position is established, since the artificial satellite signal is also included in the compensation calculation of the established satellite distances.

With a manipulated signal, it is therefore possible to not only disrupt the reception of GPS signals, as is the case for example with so-called GNSS jammers, but to deceive GNSS receivers in such a way that the consequence is incorrect positional information. However, the possibility of such attacks could be especially critical in terms of future autonomously driving vehicles, as the latter rely on reliable satellite navigation.

It is true that an authentication signal is planned for the future of the European satellite system, Galileo, which is intended to prevent the falsifying of signals of the Galileo satellites, however this service is restricted to Galileo and is not or not yet generally available so that the problem, in particular in terms of other GNSS systems, persists.

SUMMARY OF THE INVENTION

Therefore an aspect of the invention is a method which makes it possible to determine the position of a vehicle in a reliable manner and/or with little outlay, even in the event of an attack by means of a manipulated signal (spoofing).

A manipulated signal or a spoofing signal is preferably understood to be a signal which mimics a GNSS signal, or which has or imitates the frequency, data structure and/or other characteristics of a GNSS signal, but which does not originate from a GNSS satellite provided for navigation purposes.

According to an aspect of the invention, in the case of a method for determining the position of a receiving device, a GNSS signal is received, by means of the receiving device, as it is transmitted from a satellite of a global satellite navigation system, that is to say in particular it has the form and/or data structure and/or frequency thereof. Thus, the term "GNSS signal" is not necessarily to be understood to be an outgoing signal from a GNSS satellite. It is true that this is normally the case, however a spoofing attack can also involve a signal which is simply disguised as a satellite signal. The term "GNSS signal" therefore includes both possibilities below. According to an aspect of the invention, code data and phase information of the GNSS signal are determined and a plausibility check is carried out between the code data and phase information to detect whether the signal is a manipulating signal. The receiving device is preferably connected to a control device via at least one signal line, wherein the control device is formed or programmed to execute the steps of the method according to an aspect of the invention.

The method can also be applied in an equivalent manner for determining the speed or the direction thereof in the case of a receiving device and is preferably also used for this purpose.

The following steps are preferably executed:
determining code data of the GNSS signal during a first and a second scan,
determining first position information from the code data of the GNSS signal in each case for the first and the second scan,
determining phase information of the GNSS signal, in particular of the GNSS carrier signal, during a first and a second scan,
determining second position information from the phase information of the GNSS signal in each case for the first and the second scan, wherein the first and second position information relates in each case to the position of the receiving device,
comparing the change in the first position information from the first to the second scan with the change in the second position information from the first to the second scan.

The first and second scan preferably relates to the reading out, in each case, of a data message of the GNSS signal, in particular clocked by the clock of the receiving device.

The method advantageously makes it possible to carry out, in a simple manner, a plausibility check between the information from the code data of the GNSS signal and the information from the phase information of the GNSS signal. It can be ascertained whether the phase shift of the GNSS signal is realistic or compatible, in view of the code data or the position information obtained therefrom. In other words, it is checked whether the alteration in the position information is consistent during code and phase measurement, less certain tolerances. If it is not consistent or is not sufficiently consistent, it can be assumed, with a certain amount of certainty, that the signal is a false, possibly manipulated, signal, that is to say it involves so-called spoofing.

The position information, in particular the first and second position information, is preferably information which is dependent on the distance of the receiver from the satellite from which the GNSS signal originates, or the distance information itself, wherein for example a spherical surface or the intersection thereof with the Earth's surface can be produced as position information. In order to determine the position of the receiving device, multiple items of position information are preferably enlisted and fused so that, as an overlap, for example, a point or approximate point is produced as the determined position.

It is preferred that the code data comprise the satellite orbit and satellite clock data, wherein, in order to determine the first position information, the distance of the receiving device from the satellite is calculated from the signal propagation time and the satellite position. Since the code data have been transferred at the speed of light, the distance can be extrapolated back.

It is preferred that the phase information comprises the phase shift, in particular of the carrier phase, from the transmitting to the receiving of the GNSS signal, wherein, in order to determine the second position information, the number of the complete periods or phase iterations of the GNSS signal is additionally established. Starting from a distance between the receiver and satellite, which is determined by means of the code data, or starting from the first position information, the number of the complete periods or phase iterations can, for example, be established, since the wavelength of the GNSS signal is known. In order to be able to more reliably determine the exact end piece to which the signal phase is joined, known methods can be used, for example, which in turn make use of the code data.

In accordance with a preferred embodiment, the method has the step of
checking whether the difference between the change in the first position information and the change in the second position information exceeds a predefined threshold and outputting an indicator signal if this is the case. The indicator signal can, for example, be subsequently exploited further, preferably by means of electronic data processing. The indicator signal can be used alone or by taking account of further indicators which are, for example, established with other methods, in order to detect a spoofing attempt.

The indicator signal preferably contains information regarding the received GNSS signal which clearly identifies said signal. As a result of this allocation, the indicator signal can be exploited further in a targeted manner.

It is preferred that, after the indicator signal has been output once or repeatedly, the identified GNSS signal is given a weaker weighting or is excluded or is not further used as an input variable for determining the position of the receiving device. Consequently, the risk can be removed and the determination of the position of the receiving device can be continued by means of satellite navigation. A weaker weighting relates to a compensation calculation, with which the position of the receiving device is performed from multiple satellite signals by weighting the respective signals, for example with the method of the least (error) squares, taking account of a weighting.

After the indicator signal has been output once or repeatedly, a display device preferably displays, in an optically visible manner, an indication that an attempt at manipulation has been made. This can, for example, be effected with a warning message or a symbol on a display. Consequently, a human vehicle passenger can, for example, be made aware of the incident.

It is preferably checked whether the code data of the GNSS signal contain authentication data and, if this is the case, a plausibility check is carried out of the authentication data by means of the indicator signal, or vice versa. As explained at the outset, such an authentication signal is planned for the European satellite system Galileo. This or future authentication signals of other systems can preferably be enlisted in addition to or to support the indicated method for detecting spoofing.

At least GNSS signals from four different satellites are preferably enlisted to determine the position of the receiving device. Consequently, an approximately punctiform limitation of the position is possible, and information for compensating for clock errors is available.

According to a further aspect of the invention, a control device, preferably an electronic control device, is designed to perform the indicated method.

According to an additional aspect, a vehicle, in particular a vehicle which can be operated autonomously, comprises such a control device.

BRIEF DESCRIPTION OF THE DRAWINGS

The characteristics, features and advantages of aspects of the invention described above as well as the way in which these are achieved will become clearer and easier to understand in connection with the drawings explained below, which are extremely schematic in nature, wherein.

DETAILED DESCRIPTION OF THE PREFERRED EMBODIMENTS

Figure 1:
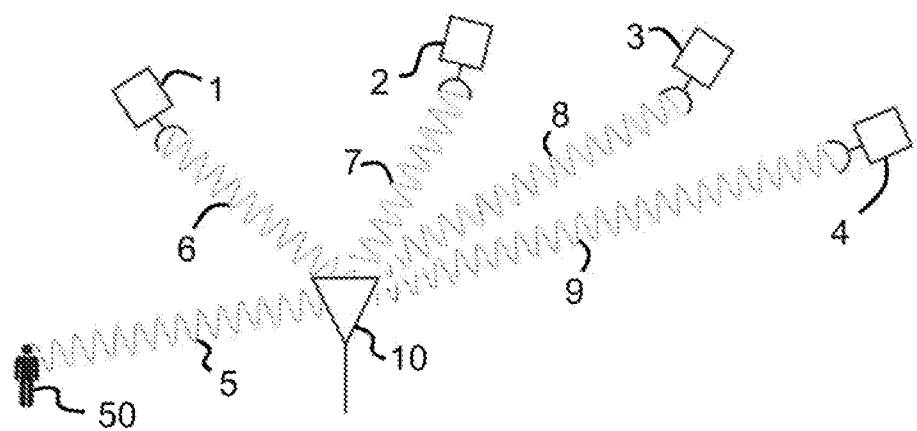
FIG. 1 shows a spoofing attack on a receiving device which receives GNSS signals from satellites of a global satellite navigation system.

In FIG. 1, a receiving device 10 for GNSS signals is represented with a triangle. This can, for example, be part of a road vehicle in the form of a fixed GNSS antenna. Since, during the position determination, even small clock errors lead to major deviations, a fourth satellite 4 is enlisted in addition to the three satellites 1, 2, 3 necessary for the position determination, in order to be able to eliminate the clock errors as additional unknowns. It is understood that, in practice, more than four satellite signals can frequently be received, which can then be utilized for increased precision or data integrity. The GNSS signals 6, 7, 8, 9 each comprise their individual code and their individual satellite orbit data or ephemerides, from which the satellite location can be calculated for each time. On its way from the satellite 1, 2, 3, 4 to the receiver, the carrier wave of the GNSS signal 6, 7, 8, 9 passes through multiple periods, that is to say full or $2\pi$ phase iterations and, additionally, has a phase end piece 61 which, knowing the number of the full phase iterations, contains particularly precise information regarding the receiver-satellite distance.

In addition to the four GNSS signals 6, 7, 8, 9 of the satellites 1, 2, 3, 4, a further GNSS signal 5 is represented in FIG. 1, which admittedly does not originate from a satellite, but from a spoofing sender 50, represented as a human symbol. An attacker is attempting to deceive the receiving device 10 with an imitated satellite signal, that is to say to bring about an erroneous position determination.

Figure 2:
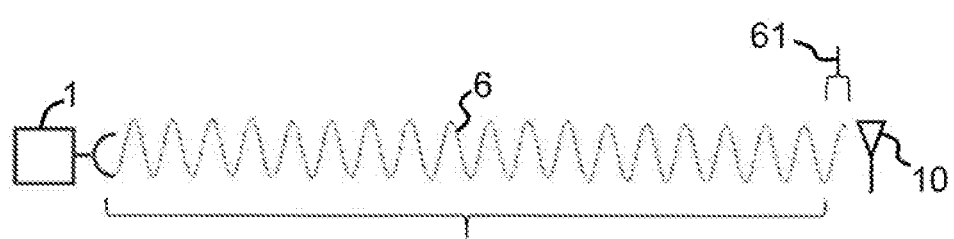
FIG. 2 shows the principle of a phase measurement in the case of a GNSS signal.

The aim of FIG. 2 is to clearly illustrate how a particularly precise distance determination between satellite 1, 2, 3, 4 or the simulated satellite and receiving device 10 is made possible with a measurement of the carrier phase of a GNSS signal 5, 6, 7, 8. The phase end piece 61 is identified in FIG. 2 with a clip. Since the wavelength of the carrier signal is known, the length corresponding to the phase end piece 61 can be easily determined. That is to say, the phase information of the GNSS signal 6 thus determined, and also the code data of the GNSS signal 6, can be enlisted in each case for an item of position information, wherein said items of position information do not deviate or only slightly deviate from one another, provided that the GNSS signal 6 actually originates from a satellite.

Figure 3:
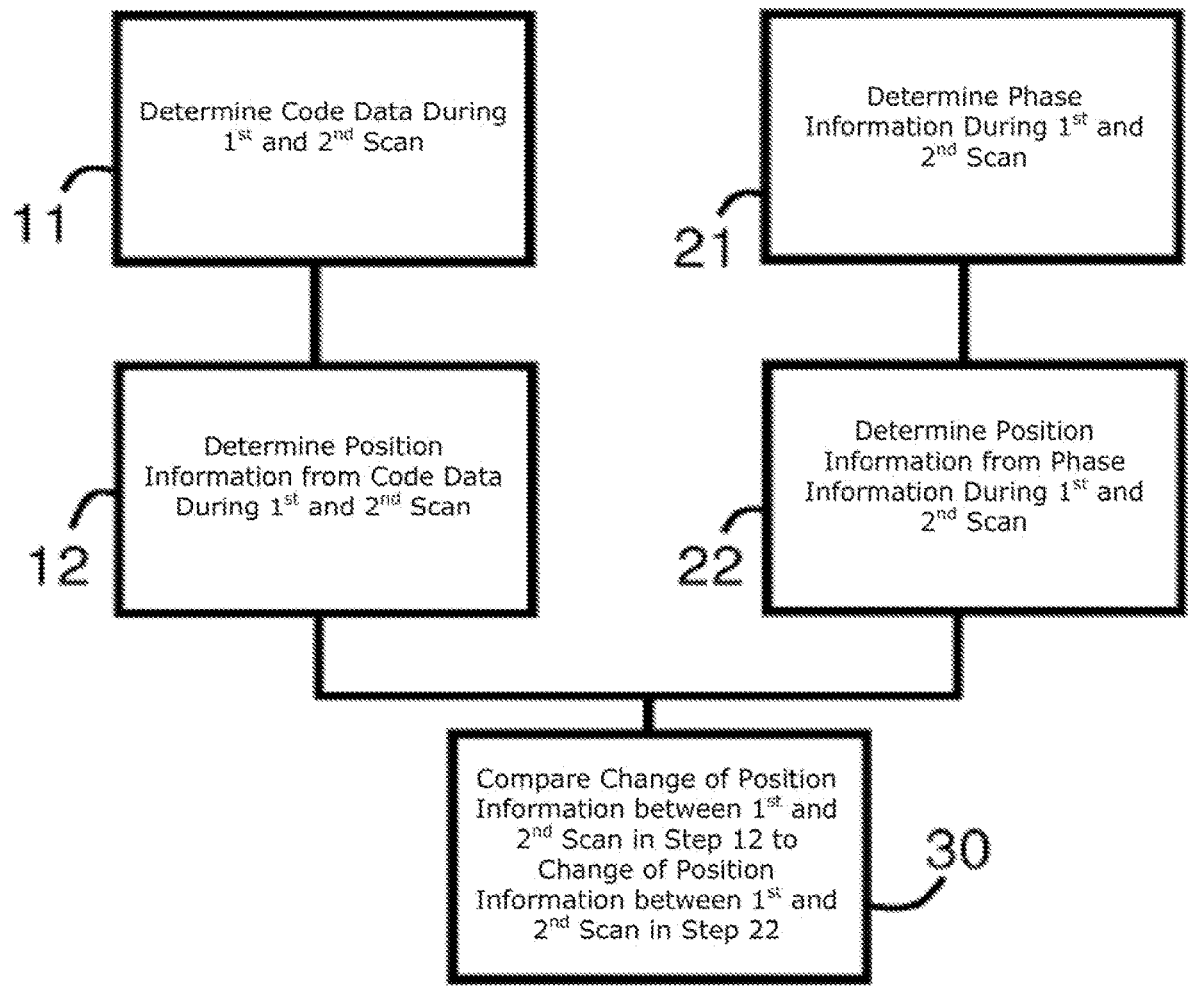
FIG. 3 shows a process in accordance with an exemplary embodiment of a method for determining the position of a receiving device.

It is illustrated with FIG. 3 how a plausibility check can be carried out between the code data and the phase information of the GNSS signal 5, 6, 7, 8, 9. This is possible thanks to the determining of the code data of the GNSS signal 5, 6, 7, 8, 9 during a first and a second scan in a first step 11. In the next step 12, position information is in each case determined for the first and the second scan from the code data of the GNSS signal 5, 6, 7, 8, 9.

Accordingly, the phase information of the GNSS signal 5, 6, 7, 8, 9, in particular of the GNSS carrier signal, is also determined during a first and a second scan in step 21. Second position information is, in each case, determined for the first and the second scan from the phase information of the GNSS signal 5, 6, 7, 8, 9 in step 22. The first and second position information relates, in each case, to the position of the receiving device 10, or more accurately the distance of the receiving device 10 from the satellite 1, 2, 3, 4 or the distance from the position of a satellite predefined by an imitated GNSS signal 5.

The change in the first position information from the first to the second scan is compared with the change in the second position information from the first to the second scan, or a difference is established, with step 30. If the two items of position information are incompatible with one another, this is an indication that the signal is not a GNSS signal 6, 7, 8, 9 of a satellite 1, 2, 3, 4 of the navigation system, but a falsified GNSS signal 5. Thanks to this step of checking the plausibility, an attacker would be compelled, instead of simply distributing a signal with falsified data content extensively, to also correctly falsify the phase shift with which the message reaches the receiving device 10, in order to successfully deceive the receiving device 10. However, this requires an observation of the receiver and a deception could only be produced for a specific vector, that is to say a point in the space having a speed in a specific direction.

The necessity of tracking a receiving device 10, establishing the position and directed movement thereof and then calculating and transmitting a falsified GNSS signal 5 for said position in real time constitutes an almost insurmountable hurdle for spoofing attackers. Moreover, extensive manipulation of multiple receiving devices 10 cannot be successfully performed when the indicated method is applied.

The invention claimed is:

1. A method for determining a position of a receiving device, the method comprising:
   receiving, by the receiving device, global navigation satellite system (GNSS) signals transmitted from satellites of a global navigation satellite system;
   determining, by the receiving device, code data and phase information of the GNSS signals;
   determining a first distance of the receiving device from one or more of the satellites, based on the code data at a first time, and determining a first position information of the receiving device based on the first distance;
   determining a second distance of the receiving device from one or more of the satellites, based on the code data at a second time subsequent to the first time, and determining a second position information of the receiving device based on the second distance;
   determining a first difference between the first position information and the second position information;
   determining a third distance of the receiving device from one or more of the satellites based on the phase information at the first time, and determining a third position information of the receiving device based on the third distance;
   determining a fourth distance of the receiving device from one or more of the satellites based on the phase information at the second time, and determining a fourth position information of the receiving device based on the fourth distance;
   determining a second difference between the third position information and the fourth position information; and
   performing, by the receiving device, a plausibility check between the first difference and the second difference to detect whether at least one of the GNSS signals is a manipulating signal, the plausibility check including:
      comparing the first difference to the second difference, and determining that at least one of the GNSS signals is the manipulating signal when the comparison indicates that the first difference is incompatible with the second difference, wherein the first position information is not equal to the first distance, the second position information is not equal to the second distance, the third position information is not equal to the third distance, and the fourth position information is not equal to the fourth distance.

2. The method according to claim 1, comprising:

determining code data of the at least one of the GNSS signals during a first and a second scan, determining the first position information and the second position information from the code data of the GNSS signal in each case for the first and the second scan, determining phase information of the at least one of the GNSS signals, in particular of the GNSS carrier signal, during a first and a second scan, determining third position information and the fourth position information from the phase information of the at least one of the GNSS signals in each case for the first and the second scan, wherein the first, second, third and fourth position information relates in each case to the position of the receiving device.

3. The method according to claim 1, wherein the code data comprise the satellite orbit and clock data, wherein, in order to determine the first position information and the second position information, the distance of the receiving device from the satellite is calculated from a signal propagation time of the received signal and a position of the satellite.

4. The method according to claim 1, wherein the phase information comprises the phase shift, in particular of the carrier phase, from the transmitting to the receiving of the at least one of the GNSS signals, wherein, in order to determine the third position information and the fourth position information, the number of the complete periods or phase iterations of the at least one of the GNSS signals is additionally established.

5. The method according to claim 2, further comprising checking whether the comparison of the first difference and the second difference exceeds a predefined threshold and outputting an indicator signal if this is the case.

6. The method according to claim 5, wherein the indicator signal contains information regarding the received at least one of the GNSS signals, which clearly identifies said signal.

7. The method according to claim 6, wherein, after the indicator signal has been output once or repeatedly, the identified at least one of the GNSS signals is given a weaker weighting or is excluded or is not further used as an input variable for determining the position of the receiving device.

8. The method according to claim 5, wherein, after the indicator signal has been output once or repeatedly, the display device displays, in an optically visible manner, an indication that an attempt at manipulation has been made.

9. The method according to claim 5, further comprising checking whether the code data of the at least one of the GNSS signals contain authentication data and, if this is the case, a plausibility check is carried out of the authentication data by the indicator signal.

10. The method according to claim 1, wherein the at least one of the GNSS signals from four different satellites are enlisted to determine the position of the receiving device.

11. A control device which is designed to perform a method according to claim 1.

12. An autonomously operated vehicle, comprising a control device according to claim 11.

13. The method according to claim 1, wherein the first, second, third and fourth position information is a spherical surface.

* * * * *